Figure 1:
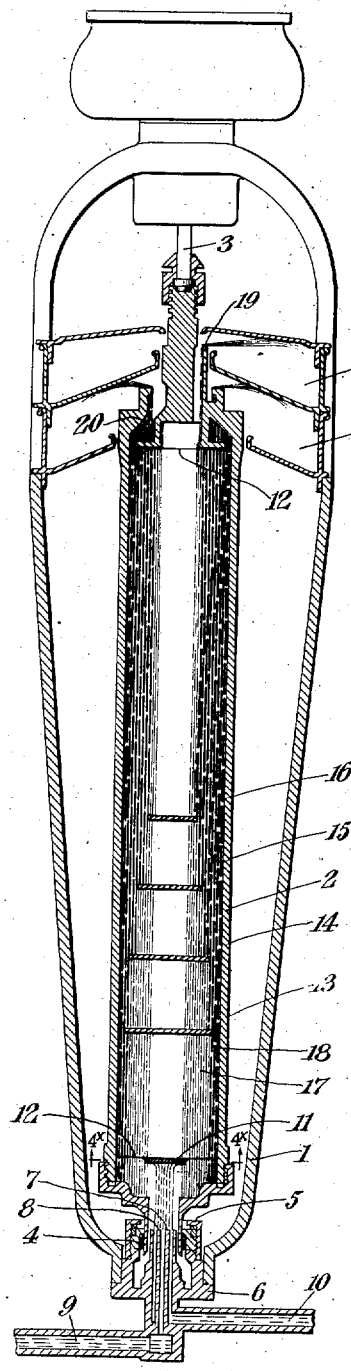

July 1, 1930. L. D. JONES Re. 17,719

PROCESS AND APPARATUS FOR SECURING TEMPORARY INTIMATE CONTACT BETWEEN IMMISCIBLE LIQUIDS

Original Filed Sept. 3, 1921

Inventor

Leo D. Jones

By his Attorneys

Kenyon & Kenyon

Reissued July 1, 1930 Re. 17,719

UNITED STATES PATENT OFFICE

LEO D. JONES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE

PROCESS AND APPARATUS FOR SECURING TEMPORARY INTIMATE CONTACT BETWEEN IMMISCIBLE LIQUIDS

Original No. 1,575,116, dated March 2, 1926, Serial No. 498,368, filed September 3, 1921. Application for reissue filed June 30, 1927. Serial No. 202,731.

This invention is a process and apparatus for bringing immiscible liquids into intimate contact by means of high centrifugal force in such manner as to utilize the centrifugal force simultaneously to secure efficient contact and to prevent substantial emulsifications of the immiscible liquids. The invention also contemplates the separate delivery of the immiscible liquids treated by or resulting from the operation.

A primary purpose of the invention is to effect a rapid and continuous treatment of one liquid with another in such manner as to obtain the treated liquid substantially free from the treating liquid.

Important problems of industry are (1) to secure reaction between immiscible liquids, and (2) to wash a liquid with an immiscible liquid. As common examples from the petroleum industry, may be cited (1) the treating of lubricating oils with sulphuric acid for the purpose of causing a reaction to take place between the sulphuric acid and certain constituents of the lubricating oil, and (2) the water washing of alkali treated lubricating oils to remove sulphonic soap by solution.

In the treatment of a lubricating oil with sulphuric acid as heretofore practiced, the acid is usually added to the oil and the two liquids emulsified by agitation. In order that the reaction may be complete, the agitation must be efficient, to give intimate contact between the sulphuric acid and the oil. This intimate contact is accomplished by the formation of an emulsion. The next step is gravity settling to permit the unused sulphuric acid and the sludge formed by reaction to settle out of the oil. Such a procedure is satisfactory in regard to the quality of oil and is practical in operation unless the viscosity of the oil is very high, in which case the emulsion of sulphuric acid sludge and oil separates too slowly under the influence of gravity.

When it is desired to wash an alkali treated lubricating oil with water to remove sulphonic acid soap, it is usually impracticable to permit any emulsification to take place, inasmuch as the water when emulsified with such an oil cannot be or is very difficultly separated by gravity or centrifugal force. Accordingly, the operation is sometimes effected by permitting water to percolate through oil. The droplets of water, in passing through the oil, dissolve the soap and the water forms a layer that may be easily drawn off. While one liquid is thus put in contact with another liquid in such a manner as to prevent the formation of emulsions, the defects of such an operation are that the work is not efficiently done unless the contact is sufficiently intimate, with resulting objectionable emulsification, and under the most favorable conditions considerable oil is emulsified and carried away with the water.

I have found that excellent results may be obtained in treating or washing one liquid with another by the use of high centrifugal force, so as simultaneously to effect intimate contact between the two liquids and prevent the substantial formation of emulsions. Moreover, I have found that the above results may be obtained by mechanical actions within the rotor of a high speed centrifugal apparatus, with the advantage of securing a continuous separate discharge of the constituents involved in the operation.

Advantages of my invention are that the contact between the liquids may be made as intimate as necessary without the formation of undesirable emulsions; the period during which the liquids are in intimate contact is extremely short compared with any other process so that secondary reactions of an undesirable character are eliminated or minimized; and the high centrifugal force tends to deliver the treated liquid with less contamination from reaction products or precipitated materials than in any other process.

In addition to these advantages, obtained generally by the use of the present invention over previous operations, there are specific cases where the present invention can be used successfully in which known operations are impracticable. For example, in washing sodium soap from naphtha with water, the soap cannot be washed out ordinarily without very efficient admixture of water with the naphtha. But the emulsion thus formed is difficult to separate by gravity or sometimes even with high centrifugal force.

In my process the water may be put in intimate contact with the naphtha without emulsification.

As another example, some lubricating oils, when treated with sulphuric acid in the usual way yield a product that, although free from constituents which will react with sulphuric acid, is still dark in color because of the charring effect of the sulphuric acid in long contact with the oil.

By my process the period of contact is short and the oil is of proper color.

Some oils cannot be treated with sulphuric acid in practice on account of their high viscosity. In order to secure efficient contact, emulsions are formed which are too stable for subsequent separation.

I have found, that by preventing the substantial emulsification of acid with this viscous oil and yet securing efficient contact, it is possible to treat these oils with sulphuric acid.

The invention contemplates various operations as (1) the treatment of a liquid with a heavier liquid, (2) the treatment of a liquid with a lighter liquid, and (3) the treatment of two liquids, one with the other.

I have found that different rotors are desirable to most efficiently practice the foregoing different method of treatment. Types of these rotors are set out in the following description and the accompanying drawings in illustration thereof.

Figure 4:
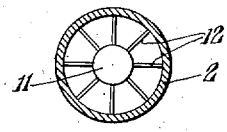
Figure 2:
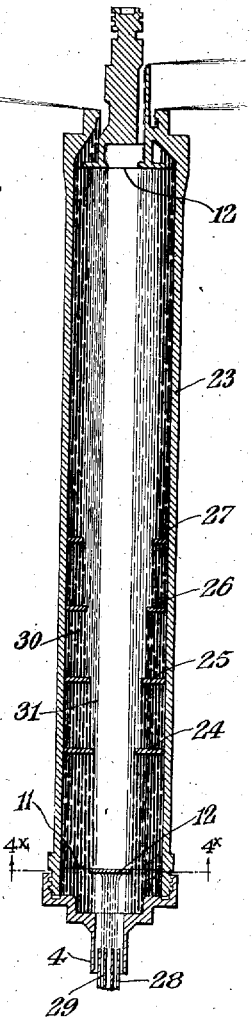
Figure 3:
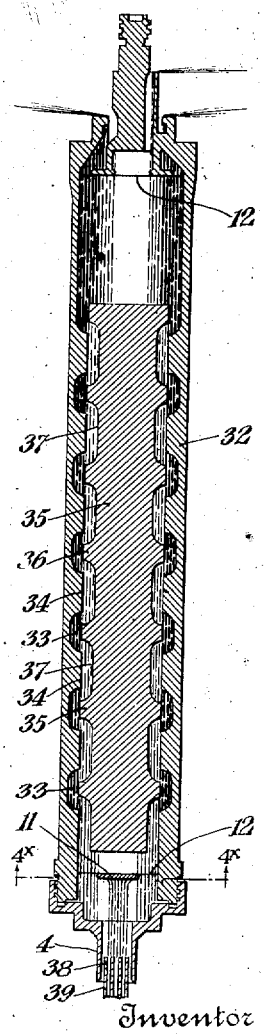

In the drawings, Fig. 1 is a vertical sectional view of a centrifugal machine having a rotor adapted for treating a light liquid with a heavy, as in the case of washing with water naphtha which has been used for dry cleaning; Fig. 2 is a vertical sectional view of a rotor adapted for treating a heavy liquid with a light, as in the extraction of oily matter from an aqueous emulsion by means of naphtha; Fig. 3 is a vertical sectional view of a rotor adapted for effecting complete temporary contact between a heavy and a light liquid with efficient action of each upon the other, and Fig. 4 is a sectional view taken on the line 4x—4x of Figs. 1, 2 and 3.

The centrifugal apparatus illustrated in Fig. 1 comprises a frame 1 in which is a rotor or revoluble bowl 2 suspended by a spindle 3 and having an axial tubular bottom boss 4 revoluble in a "drag" 5, the latter being carried by a plug 6 set in the bottom of the frame. Concentric nozzles 7 and 8 are carried by the plug 6, extend into the boss 4 and connect the respective conduits 9 and 10 therewith for delivering two liquids, as water and naphtha, into the bowl, against the spreader 11 fixed in the bottom thereof, the wings 12 fixed in the bowl catching the liquid and giving them the desired motion.

Discs forming dams 13, 14, 15 and 16 are fixed in the bowl concentrically thereto at intervals along its axis, the discs decreasing in diameter from the lower to the uppermost.

When sufficient quantities of both liquids have been passed through the nozzles into the bowl and subjected to centrifugal force, the lighter liquid 17 is compelled to flow upward over the edges of the respective discs or dams in thin layers, in contact with the heavier liquid 18 exterior thereto, the attenuated character of the cross sections of the lighter liquids flowing over the peripheries of the discs securing the intimate contact of all the particles thereof with the heavier liquid, by which the lighter is thoroughly washed. After passing the uppermost disc, at the completion of the washing operation, the washed liquid and the heavier washing liquid with the matter washed out of the lighter, centrifugally separated in the top of the bowl, are discharged therefrom through the respective outlets 19 and 20 to the respective receptacles 21 and 22 carried by the frame.

The rotor or bowl 23, illustrated in Fig. 2, is varied from the rotor 1 shown in Fig. 1 by the use of dams in the form of rings 24, 25, 26 and 27, fixed at right angles to the axis at intervals along the internal surface of the bowl, the rings having gradually increasing internal diameters from the lower to the uppermost.

When a heavier liquid is to be treated with a lighter, as for instance in the extraction of an oily material from an aqueous emulsion by means of naphtha, the liquid to be treated and the treating liquid are fed into the bowl through the respective nozzles 28 and 29, and are carried upwardly by centrifugal force over the inner edges of the dams 24, 25, 26 and 27 in succession. In passing over these dams, the depth of the outer heavier liquid 30 is slight, so that intimate contact is effected between all of its particles and the inner treating liquid 31 by the actions of the dams in succession. The treated and treating liquids, centrifugally separated in the top of the bowl, are separately discharged therefrom, the lighter liquid carrying therewith the substance removed from the heavier.

The rotor or bowl 32, illustrated in Fig. 3, has formed therein the annular channels 33 and dams 34 disposed at intervals along its length. A core 35, disposed centrally in the bowl, has formed thereon the annular dams or rings 36 with the annular channels 37 between them, these rings and channels registering with the respective channels 33 and 34, the surfaces of the rings in the bowl and on the core having diameters approximately equal.

When a heavy and a light liquid are fed into the bowl, through the respective nozzles 38 and 39, the lighter liquid flows in films or thin layers over the comparatively wide dams or rings 36 in contact with the heavier liquid in the channels 33 and the heavier liquid flows over the comparatively wide dams or rings 34 in thin films or layers in contact with the lighter liquid in the channels 37. There is thus effected an intimate and complete contact of each liquid with and treatment by the other in passing to the top of the bowl, where they are separated and separately discharged.

It will be understood from the foregoing that while all of the particles of one liquid can be brought into contact with another by the foregoing operations, such operations are, by reason of the centrifugal force involved therein, effective to prevent the mixing and emulsifications of the liquids.

From the foregoing it will be apparent that the very high degree to which intimate contact is mechanically brought about in accordance with my invention, is effective to cause acid treatment to a desired degree within a short period of time, and by so effecting the acid treatment to desired degree the possibility of undesired action of acid on the oil due to prolonged contact of the oil with acid is minimized or eliminated provided the oil and acid are promptly taken out of intimate contact. The period of highly intimate contact is substantially independent of the speed of rotation of the centrifugal bowl and is chiefly dependent upon and is controlled by the rate at which oil and acid are fed to the bowl. Furthermore the centrifugal stratification of the oil and acid sludge into relatively thick strata and their separate discharge after a controllable predetermined period of intimate contact between oil and acid affords effective protection against injury to and loss of oil resulting from prolonged contact with acid and affords means for definitely controlling the period of contact between acid and oil. It is to be understood that in the practice of my invention, acid and products of the reaction between oil and acid are discharged from the centrifuge together and oil is discharged separately. It will also be apparent that in treating one substance with another in accordance with my invention, extensive contact surface is mechanically produced between the two substances while both of them remain continuous as compared with the case in which intimate contact is produced by emulsification that causes one of the substances to be dispersed within the other. As a consequence the difficulties of breaking an emulsion after intimate contact are avoided and it is readily possible to control the period of intimate contact, whereas the production of intimate contact by emulsification makes it impossible to control definitely the period of intimate contact because the difficulty of breaking emulsions renders it impossible to predetermine how long extensive contact will persist. It will also be apparent from the foregoing that in the practice of this invention two substances are brought together and immediately start to flow toward the point at which they are centrifugally discharged separately and thus definitely and certainly taken out of contact; and that at least once during such flow toward that point, and several times in the construction shown, one or both of the substances, or each substance alternately, exists in a form in which its surface is extremely great as compared with its volume while it is in contact with the other substance, and one or both substances are maintained continuous and possibility of emulsification minimized. In the construction shown a substance flows over a dam in a layer while it is in contact with the other substance and the rate of flow may be such that the thickness of that layer is as small as desired, and the effect is as though one, or both, of the substances were spread, one or more times into a layer or stream of extremely fine cross-section—as though a substance were extended into a film, one or more times, and then contacted with another substance. It is important that the flowing body of one substance, for example an acid, is intensely distorted and thereby caused to have extremely great surface in contact with the other substance, such intense distortion being known technically as intense liquid sheer. A further and important advantage of the specific features of the invention is that when the substances are caused thereby to remain in separate strata the likelihood of emulsification is minimized, or at least the substances do not stand for any appreciable time in an emulsified state.

Having described my invention, I claim:—

1. The process of treating one liquid substance with another immiscible liquid substance of different density, which consists in centrifugally stratifying said substances in concentric layers and flowing one of said substances in a thin layer or layers in contact with the other of said substances without emulsification.

2. The process of treating one liquid substance with another liquid substance of different density, which consists in centrifugally stratifying said substances and causing one to flow with a thin cross section thereof in contact with the other without emulsification, and centrifugally discharging said substances separately.

3. The process of treating one liquid substance with another immiscible liquid substance of different density, which consists in flowing said substances together over a dam or dams in stratified relation and forming one or more thin sections in one or more of said substances so as to effect substantially complete contact between one or both of said substances.

4. The process of treating one liquid substance with another of different density, which consists in centrifugally stratifying said substances, reducing the cross section of one stratum so as to form a thin ring or rings therein in contact with the other stratum, and centrifugally separating and separately discharging the liquids resulting from the treatment.

5. The process of treating one liquid substance with another of different density, which consists in centrifugally stratifying said substances and reducing the cross section of each stratum so as to form a thin band of each liquid in contact with the other.

6. The apparatus for treating liquid substances which comprises a revoluble bowl having therein one or more dams over which the substances pass in contact in reduced section or sections and means for separating and separately discharging said substances.

7. The apparatus for treating liquid substances which comprises a revoluble bowl having therein a plurality of axially spaced dams forming passages of different cross sections and having edges concentric to the axis of rotation over the peripheries of which dam or dams a lighter substance flows in contact with the heavier.

8. The apparatus for treating liquid substances which comprises a revoluble bowl having therein axially spaced dams in the form of rings concentric with the axis of rotation over the inner edges of which a heavier substance flows in contact with a lighter.

9. The apparatus for treating liquid substances of different densities, which comprises a revoluble bowl having dams therein arranged in staggered relation and provided with overflow edges having centers lying in the axis of rotation between which edges substances under treatment are carried.

10. The apparatus for treating liquid substances of different densities which comprises a revoluble bowl having an inner surface provided with a plurality of dams separated by channels in combination with a plurality of dams having peripheries concentric with the axis of rotation and disposed between dams aforesaid.

11. The apparatus for treating liquid substances which comprises a centrifugal rotor, a plurality of inlets discharging into said rotor, a plurality of axially spaced dams within said rotor and over which pass thin layers of one liquid in contact with the other liquid, and means for separating and separately discharging said liquids from said rotor.

12. The process of treating one liquid with another which consists in flowing them in concentric strata while subject to centrifugal force, and repeatedly damming the flow of one of said strata and diverting a thin layer therefrom in intimate contact with the other liquid.

13. The process of treating liquid hydrocarbons with an immiscible acid having a specific gravity different from that of the hydrocarbons, which comprises centrifugally stratifying a liquid hydrocarbon and the acid in contact, reducing the thickness of the stratum of one substance to form a stream of that substance of small cross-section in intimate contact with the stratum of the other substance, and centrifugally separating and separately discharging the liquid hydrocarbon and the resulting acid sludge and thereby limiting the period of intimate contact between the acid and liquid hydrocarbon to prevent undesirable action of the acid upon the liquid hydrocarbon, whereby continuous acid-treatment of liquid hydrocarbon is effected with minimum loss.

14. In the treatment of liquid hydrocarbons with an immiscible acid having a specific gravity different from that of the hydrocarbons the steps comprising bringing the hydrocarbons and the acid together and flowing them in contacting strata to a centrifugal separating operation, during such flow and while maintaining such substances in separate contacting strata reducing to a small area in a direction transverse to the direction of flow at least one of the two substances so flowing in contact, and thereby obtaining extensive surface contact between said substances during the flow thereof, after a predetermined period of contact of hydrocarbon and acid limited to minimize undesirable action of the acid upon the hydrocarbons delivering the two substances to the separating operation, and separately discharging acid-treated hydrocarbons and acid sludge from the separating operation.

15. In the treatment of liquid hydrocarbons with an immiscible acid having a specific gravity different from that of the hydrocarbons the steps comprising bringing the hydrocarbons and the acid together and flowing them in contact to a centrifugal separating operation, during such flow reducing to small area in a direction transverse to the direction of flow at least one of the two substances while the substances are flowing in contact and the other substance remains continuous and thereby obtaining extensive surface contact between said substances during the flow thereof, after a predetermined period of contact of hydrocarbons and acid limited to minimize undesirable action of the acid upon the hydrocarbons delivering the two substances to the separating operation, and separately discharging acid-treated hydrocarbons and acid sludge from the separating operation.

16. In the treatment of liquid hydrocarbons with an immiscible acid having a specific gravity different from that of the hydrocarbons, the steps comprising bringing the hydrocarbons and the acid together and flowing them in contact to a centrifugal separating operation, during such flow reducing to small area in a direction transverse to the direction of flow both substances so flowing in contact while maintaining continuous at least one of the substances and thereby obtaining extensive surface contact between said substances during the flow thereof, after a predetermined period of contact of hydrocarbons and acid limited to minimize undesirable action of the acid upon the hydrocarbons, delivering the two substances to the separating operation, and separately discharging acid-treated hydrocarbons and acid sludge from the separating operation.

17. In the treatment of liquid hydrocarbons with an immiscible acid having a specific gravity different from that of the hydrocarbons, the steps comprising bringing the hydrocarbons and the acid together and flowing them in contact to a centrifugal separating operation, during such flow reducing to a small area in a direction transverse to the direction of flow each of the two substances one at a time while said substances are flowing in contact and thereby obtaining extensive surface contact between the hydrocarbons and the acid during the flow thereof, after a predetermined period of contact of hydrocarbons and acid limited to minimize undesirable action of the acid upon the hydrocarbons delivering the two substances to the separating operation, and separately discharging acid-treated hydrocarbons and acid sludge from the separating operation.

18. In the treatment of liquid hydrocarbons with an immiscible acid having a specific gravity different from that of the hydrocarbons, the steps comprising bringing the hydrocarbons and the acid together and flowing them in contact to a centrifugal separating operation, during such flow intensely distorting at least one of said substances while said substances are flowing in contact and the other substance remains continuous and thereby obtaining extensive surface contact between the hydrocarbons and the acid during the flow thereof, after a predetermined period of contact of hydrocarbons and acid limited to minimize undesirable action of the acid upon the hydrocarbons, delivering the two substances to the separating operation, and separately discharging acid-treated hydrocarbons and acid sludge from the separating operation.

19. In the treatment of liquid hydrocarbons with an immiscible acid having a specific gravity different from that of the hydrocarbons, the steps comprising bringing the hydrocarbons and the acid together and prior to substantial agitation thereof starting them flowing in contacting strata to a centrifugal separating operation, during such flow and while maintaining the substances in separate contacting strata causing the stratum of one substance to move relatively to the stratum of the other substance in contact therewith and thereby obtaining extensive surface contact between the hydrocarbons and the acid during the flow thereof, after a predetermined period of contact of hydrocarbons and acid limited to minimize undesirable action of the acid upon the hydrocarbons delivering the two substances to the separating operation, and separately discharging acid-treated hydrocarbons and acid sludge from the separating operation.

20. A process for the treatment of liquid hydrocarbons with an immiscible acid having a specific gravity different from that of the hydrocarbons, which comprises bringing the hydrocarbons and the acid together and prior to substantial admixture thereof centrifugally stratifying the acid and hydrocarbon and flowing one of the substances in a thin layer or layers in contact with the other substance without emulsification.

21. A process for the treatment of liquid hydrocarbons with an immiscible acid having a specific gravity different from that of the hydrocarbons, which comprises bringing the hydrocarbons and the acid together and prior to substantial admixture thereof centrifugally producing between the hydrocarbon and the acid, surface contact substantially greater in extent than the area of the interface of the resulting strata of the substances centrifugally treated while maintaining at least one of said substances continuous, and centrifugally discharging the substances separately.

Signed at Philadelphia, in the county of Philadelphia and State of Pennsylvania, this 28th day of June, 1927.

LEO D. JONES.